United States Patent
Chait et al.

(10) Patent No.: US 7,827,092 B2
(45) Date of Patent: Nov. 2, 2010

(54) SYSTEM AND METHOD FOR TRADING FINANCIAL INSTRUMENTS USING MULTIPLE ACCOUNTS

(75) Inventors: Jonathan Chait, Zug (CH); Thomas P. Peterffy, Greewich, CT (US)

(73) Assignee: Interactive Brokers LLC, Greenwich, CT (US)

( * ) Notice: Subject to any disclaimer, the term of this patent is extended or adjusted under 35 U.S.C. 154(b) by 530 days.

(21) Appl. No.: 11/104,671

(22) Filed: Apr. 13, 2005

(65) Prior Publication Data

US 2006/0235785 A1    Oct. 19, 2006

(51) Int. Cl.
G06Q 40/00    (2006.01)

(52) U.S. Cl. .................................... 705/37; 705/36 R

(58) Field of Classification Search .............. 705/5, 705/35, 36, 37, 41, 42, 43, 36 R
See application file for complete search history.

(56) References Cited

U.S. PATENT DOCUMENTS

| | | | |
|---|---|---|---|
| 7,110,981 B1* | 9/2006 | Sidikman et al. | 705/43 |
| 7,165,045 B1* | 1/2007 | Kim-E | 705/37 |
| 7,249,080 B1* | 7/2007 | Hoffman et al. | 705/35 |
| 2002/0091605 A1* | 7/2002 | Labe et al. | 705/36 |
| 2003/0023463 A1* | 1/2003 | Dombroski et al. | 705/5 |
| 2003/0050879 A1* | 3/2003 | Rosen et al. | 705/35 |
| 2006/0010064 A1* | 1/2006 | Noriega et al. | 705/37 |
| 2006/0015436 A1* | 1/2006 | Burns et al. | 705/37 |
| 2006/0224495 A1* | 10/2006 | Vinte | 705/37 |

* cited by examiner

Primary Examiner—James A Kramer
Assistant Examiner—Eric T Wong
(74) Attorney, Agent, or Firm—McDermott Will & Emery LLP

(57) ABSTRACT

A system and method for trading financial instruments from a master account having a plurality of sub-accounts. A user defines an account group, which includes a plurality of sub-accounts, and the user selects an allocation model for the account group from a group of allocation models. After executing an order of financial instruments for the account group, the order is allocated to the sub-accounts using the allocation model. Prior to executing the order, a financial capability of the account group to execute the order using a primary allocation model is evaluated, and a secondary allocation model is used if the order cannot be allocated using the primary allocation model. The financial capability of the account group may be evaluated in real-time, and a partially executed order may also be allocated to the sub-accounts in real-time. Upon the execution of the order being completed, the order is reallocated to the sub-accounts using the selected allocation model.

21 Claims, 2 Drawing Sheets

SYSTEM AND METHOD FOR TRADING FINANCIAL INSTRUMENTS USING MULTIPLE ACCOUNTS

FIELD OF THE INVENTION

The invention relates generally to a financial system and method for managing portfolios and, more specifically, a system and method of allocating an order made in a master account to sub-accounts associated with the master account.

BACKGROUND OF THE INVENTION

Many managers (i.e., money managers or fund managers) of financial assets promote or advertise their services and/or funds in conjunction with a particular market sector or investing/trading style. For example, a fund manager may concentrate in one or more fields, such as emerging markets, small-cap technical funds, junk bonds, commodity options, etc. When a client provides capital to such a fund manager, the client has an expectation that any trades executed within the fund by the fund manager will be shared equally by all the clients in the fund, no matter how large or small the client.

Conventionally, when a fund manager executes an order for a fund, the fund manager determines the size of the order (for example, a buy order for 1000 shares of stock A) and pre-allocates the order to the clients associated with the fund (for example, 100 shares to client X, 300 shares to client Y, and 600 shares to client Z). As the order is executed, the shares are then distributed to the clients within the fund. An issue arises, however, when the order can only be partially executed (for example, only 600 shares of stock A are available at the desired price). In such a situation, partial orders are first distributed to the largest client within the fund and then to smaller clients within the fund. In the example, client Z would receive 600 shares of stock A.

A problem occurs if the partial order can no longer be executed (for example, the price of stock A has risen higher than the desired asking price) or the remaining portion of the order is filled at a different price than the price for the other partial orders. In the first instance, client Z receives 600 shares of stock A, whereas clients X and Y do not receive any shares. In the second instance, either client Z or clients X and Y receives shares at a higher/lower price than the other. In both instances, the desired goal of having all the clients within the fund share equally on the trades made by the fund manager is not accomplished since each client receives unequal portions of the trade. There is, therefore, a need to provide the capability to a fund manager to equitably allocate the results from trades made for a fund/account that includes multiple clients.

SUMMARY OF THE INVENTION

This and other needs are met by the present invention. According to one aspect, the present invention includes a system and method for trading financial instruments from a master account having a plurality of sub-accounts. A user defines an account group, which includes a plurality of sub-accounts, and the user then selects an allocation model for the account group from a group of allocation models. After fully or partially executing an order of financial instruments for the account group, the order is allocated to the sub-accounts using the allocation model. Prior to executing the order, a financial capability of the account group to execute the order using a primary allocation model is evaluated, and a secondary allocation model is used or the order is modified if the order cannot be allocated using the primary allocation model. The financial capability of the account group may be evaluated in real-time, and a partially executed order may also be allocated to the sub-accounts in real-time. Upon the execution of the order being completed, the order is reallocated to the sub-accounts using the selected allocation model.

In a further aspect of the invention, the allocation model is selected from the group consisting of: equal quantity weighted, net liquidation weighted, available equity weighted, percentage of order, ratio of order, and percentage of existing position.

Additional advantages of the present invention will become readily apparent to those skilled in the art from the following detailed description, wherein only an exemplary embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION OF THE PREFERRED EMBODIMENTS

Figure 1:
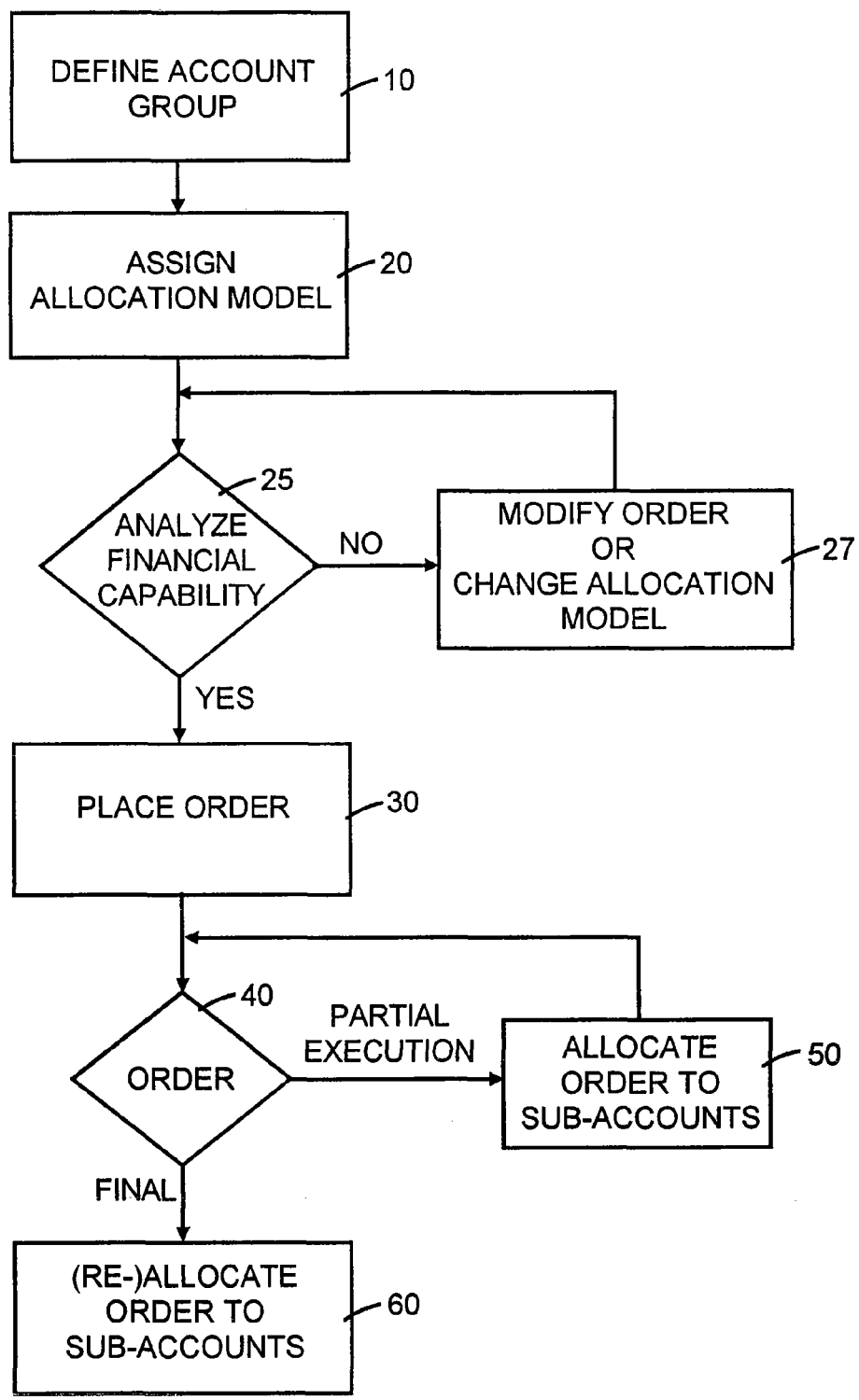
FIG. 1 is a schematic flow diagram showing the process steps of how an order is allocated to sub-accounts within an account group.

In accordance with one aspect of the invention, a method for trading financial instruments from a master account having a plurality of sub-accounts is illustrated in FIG. 1. In step 10, a user (e.g., financial advisor, money manager, etc.), defines an account group that includes a plurality of sub-accounts. In step 20, the user selects an allocation model for the account group from a group of allocation models. The user then places the order in step 30, and if the order is partially executed, step 40, the order is allocated to the sub-accounts in step 50 using the allocation model in step 60. Upon the order being finalized, step 40, the order is allocated or re-allocated to the sub-accounts in step 60 using the allocation model.

Figure 2:
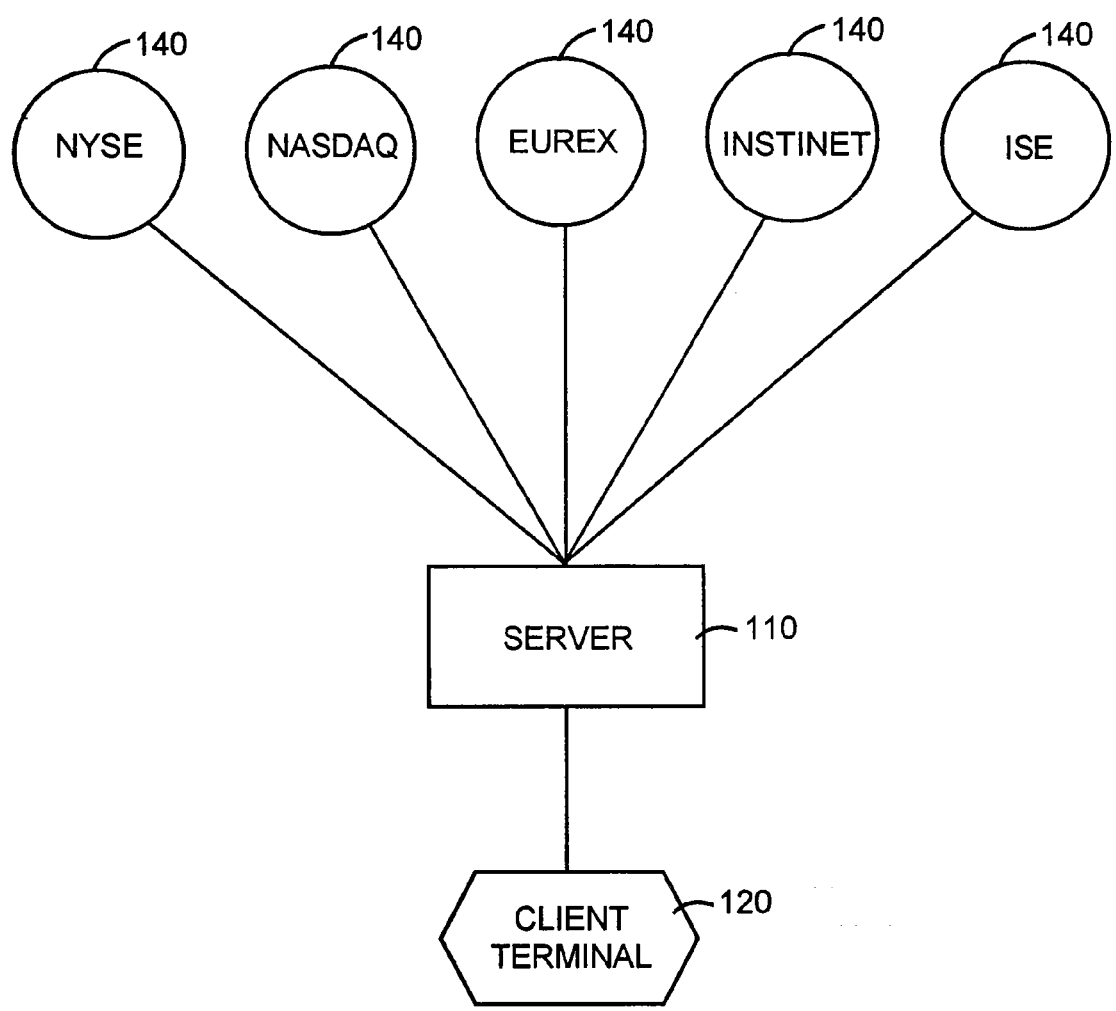
FIG. 2 is a schematic diagram illustrating the system showing connections between a server, a client terminal, and trading entities.

The system for trading financial instruments is illustrated in FIG. 2, the user is connected to a server 110 via a client terminal 120, and the invention is not limited in the particular manner in which the client terminal 120 is connected to the server 110. For example, the client terminal 120 may connect to the server 110 via the internet. Alternatively, a direct connection, such as a dial-up connection, may be made between the server 110 and the client terminal 120. As used herein, the term client terminal 120 may mean a single computer or computer program. Either the client terminal 120, the server 110, or both may execute one or more computer programs that execute the method described herein. The server 110 is also connected to trading entities 140 or intermediaries 140 for trading entities, such as NYSE, NASDAQ, Eurex, ISE and Instinet. It should be noted, however, that the invention is not limited as to a particular trading entity 140 or intermediary 140 for trading to which the server 110 connects.

An illustrative but not exclusive list of financial products/instruments capable of being traded with the present system and method include stocks, stock options, stock index options, single stock futures, exchange-traded funds, mutual funds, bonds, currencies, commodity futures, financial futures, index futures, single stock futures, options on futures, and any financial products subject to futures/derivatives/securities regulation.

In step 10, the system enables a particular user of a master account to create one or more account groups. Each account group includes a plurality of individual accounts, hereinafter referred to as sub-accounts, within the master account, and at least one allocation model is associated with the account group. To create an account group, the user creates a desired group name in the system. Upon determination that the desired group name is unique to the master account, the new group name is recorded in a database. Once a name has been created for the account group, the user can later delete the account group, edit the group name, add/remove accounts within the account group, and otherwise modify any settings associated with this particular account group. A particular sub-account may be associated with more than one account group.

After creation of the new account group, in step 20, the user selects a particular allocation model that will be associated with the account group. The allocation model is an integrated rule set that is applied to any financial transactions/orders associated with the account group. The allocation model can include any number of rule sets associated with any number of conditions. For example, one rule set may be selected for opening trades and another rule set may be selected for closing trades. Additionally, a secondary rule set may be selected in case the primary rules are not possible, for example, due to limitations in the financial capability of one or more sub-accounts in the account group to complete a particular order.

In a current aspect of the system, the system presents the user with a list of account groups associated with the user and a list of available allocation rule sets. Upon selecting a particular account group, the user can associate a particular allocation model (i.e., rule set) with the account group. Furthermore, the user may select the time duration for when the allocation rule set is to be used with the account group. Illustrative examples include selecting a default allocation rule set, selecting the allocation rule set only for the session, or selecting the allocation rule set only for the next order.

If the allocation rule set is selected as a default, the allocation rule set is associated with the account group over multiple sessions unless changed or overruled. By selecting the rule set only for the session, the selected rule set overrides any default rule set for the length of the session. Likewise, by selecting the rule set only for the next order, the selected rule set overrides any default rule set or rule set for the session-only for the next order. With this particular logic, the rule is that the shorter duration association prevails (e.g., next order only prevails over session-only, and session-only prevails over default).

In addition to a primary allocation rule set, the user may select a secondary or backup rule set to be associated with a particular account group. Similar to the primary allocation rule set, a user may select the secondary/backup rule only for certain times periods (e.g., default, only for session, next order).

Although, the system may provide the user with predefined rule sets, the system may also provide the user with the ability to create a rule set that was not previously defined. The following are examples of rule sets that can be associated with an account group. These examples should be considered as illustrative and not limiting as to the type of allocation rule sets that can be used with the system.

Example "Equal Quantity Weighted"

In this rule set, shares are distributed equally between all sub-accounts in the account group. For example, if the user transmits an order for 400 shares of stock ABC and the account group includes four sub-accounts, each sub-account receives 100 shares. An example of a secondary rule set that is associated with this primary rule set is illustrated in the following example. If the account group includes six sub-accounts, each account receives 66 shares of stock ABC, and 1 share is allocated to each account until all shares are distributed.

Example "Net Liquidation Weighted"

Shares are distributed based upon the net liquidation value of each sub-account. The system is not limited as to the particular time at which the net liquidation value (i.e., total account value) of each sub-account is determined. For example, the net liquidation value may be based on the net liquidation value of each sub-account at the close of the previous business day. However, in a current aspect of the system, the net liquidation value of each sub-account is determined in real-time at the time of the order. For example, at the time of an order, the account group includes three sub-accounts, A, B, and C, with net liquidation amounts of $25,000, $50,000, and $100,000, respectively. Upon an order transmittal of 700 shares of stock XYZ, the system calculates a ratio of 1:2:4 based upon the net liquidation values of the three sub-accounts and allocates 100 shares to sub-account A, 200 shares to sub-account B, and 400 shares to sub-account C.

Example "Available Equity Weighted"

This rule set is similar to "Net Liquidation Weighted" except that instead of calculating the allocation ratio based upon net liquidation of the sub-account, the allocation ratio is based upon the available liquidity (equity) within each sub-account. The available liquidity used in the calculation may be based upon the available liquidity of each sub-account at the close of the previous business day; however, in a current aspect of the system, the available liquidity of each sub-account is determined in real-time at the time of the order. For example, at the time of an order, the account group includes three sub-accounts, A, B, and C, with available liquidity amounts of $50,000, $100,000, and $200,000, respectively. Upon an order transmittal of 700 shares of stock XYZ, the system calculates a ratio of 1:2:4 based upon the available liquidity of the three sub-accounts and allocates 100 shares to sub-account A, 200 shares to sub-account B, and 400 shares to sub-account C.

Example "Percentage of Order"

A percentage is manually pre-assigned to each sub-account. Before allowing the user to save the assigned percentages, if a total of the percentages assigned to each sub-account does not equal 100%, the system may prompt the user to readjust the percentages until the percentages add up to 100%. Alternatively, or in addition, the system may recalculate the percentages for each sub-account based upon the currently assigned percentages so that the total percentage equals 100%. For example, if four sub-accounts, A-D, were each initially assigned 25% and a fifth sub-account, E, was added and assigned a percentage of 25%, the system may recalculate the percentages based upon 125%, such that each sub-account would now be assigned a percentage of 20% (i.e., $25/125$).

Example "Ratio of Order"

This rule set is similar to "Percentage of Order" except that instead of calculating the allocation ratio based upon set percentages for each sub-account, the allocation ratio is based upon true ratios. Furthermore, unlike the "Percentage of Order" rule set, which requires that the total percentages allocated to each sub-account eventually equal 100%, when the ratio rule set is used, the system automatically calculates the percentages based upon the ratios. For example, assuming four sub-accounts set with a ratio of 4:2:1:1, an order for 1000 shares would be allocated to the four sub-accounts as follows: 500, 250, 125, and 125.

Example "Fixed Number"

At the time of an order, the user defines the number of shares each sub-account in the account will receive. The total order size is determined by multiplying the number of shares per sub-account by the number of sub-accounts in the account group. For example, if the account group has 12 sub-accounts, and the user selects 500 shares of XYZ stock, then the total order size will be 6000 shares of XYZ stock. Upon execution of the transaction, each sub-account with receive 500 shares of XYZ stock.

Example "Percentage of Existing Position"

This rule set is used to increase an already existing position. A positive percentage may be used to increase a position, and a negative percentage may be used to decrease a position. As an example, three of the six sub-accounts in account group hold long positions in stock XYZ with client A having 100 shares, client B having 400 shares, and client C having 200 shares. To increase these holdings by 50%, "50" would be entered into a percentage field in the system. The system then calculates the order size, which in this case would equal 350 shares, and the system allocates 50 shares to Client A, 200 shares to Client B, and 100 shares to Client C. Tables 1 and 2 illustrate one example of how the system can be programmed to handle percentages with different types or orders and positions.

TABLE 1

| BUY ORDER | Positive Percent | Negative Percent |
|---|---|---|
| Long Position | Increases position | No effect |
| Short Position | No effect | Decreases position |

TABLE 2

| SELL ORDER | Positive Percent | Negative Percent |
|---|---|---|
| Long Position | No effect | Decreases position |
| Short Position | Increases position | No effect |

The "Percentage of Existing Position" rule set may also include specialized rules for opening and closing order. An opening order creates a new position, and a closing trade closes an existing position. Using the same example discussed above, to close out all the long positions for the three out of the five sub-accounts in the account group, a closing order can be created by entering in "−100" in the percentage field. The system then calculates 100% of each position for every sub-account in the account group that holds a position in the particular financial instruments, and sells all shares to close the positions. Thus, only sub-accounts with a existing position in the financial instruments are considered.

For opening orders, the user may have the option of selecting between a percentage increase for existing holders or a percentage increase for the account group. The first example is an illustration of how the system treats a trade based upon a percentage increase for existing holders. By selecting a percentage increase for the account group, those sub-accounts that do not have already a position will gain a position. Although the percentage increase will be based only on positions for sub-accounts that have positions, the shares resulting from the order will be based upon the default rule set for the account group unless otherwise changed by the user.

Prior to submitting an order, in step 25 the system may analyze the financial capability of the account group and each sub-account in the account group using, for example, a real-time credit manager. The credit manager evaluates, in real-time, the margin requirements of the sub-accounts to determine the financial capability of the particular sub-account. A further description of margin requirements and a real-time credit manager is found in U.S. patent application Ser. No. 10/465,827, entitled "System for Managing Multiple Types of Accounts Having Different Regulatory Requirements," which is incorporated herein in its entirety by reference.

Depending upon the rule set to be used from a particular transaction and the particulars of each sub-account in the group account, the transaction may not be able to be completed in the manner (i.e., using the allocation rule set) chosen by the user. To determine whether or not an order can be placed, the system may provide the user the real-time financial capability of the account group as a whole and/or of the individual sub-accounts. If the order cannot be executed using the selected allocation rule set, in step 27, the system may provide one or more options to the user.

One option would be for the system to reject/cancel the order. A second option would be for the system to reduce the order until all the sub-accounts in the account group can accept the proposed transactions and either automatically submit the order or prompt the user for approval prior to submitting the order. The reduction of the order amount can be preset (i.e., by 20%) by the system or the system may prompt the user to enter a particular percentage by which the order will be reduced. Another option would be allow the user to override the system and allow the order as long as the total order can be allocated somewhere in the group. Furthermore, the user may recognize that pending trades associated with the account group or particular sub-accounts in the account group may affect financial capability of the account group to complete a particular order.

Still another option would be to have the system use a secondary or backup allocation rule set that has been selected by the user, and the use of the backup allocation rule set may be done automatically or may require pre-approval by the user. Although the user may select the secondary/backup allocation rule set, a default allocation rule set may alternatively be preprogrammed into the system. This default allocation rule set may also be used as a rule set of last resort on an occasion when the primary and secondary/back rule sets cannot be satisfied. In a current aspect of the system, a default allocation rule set is the "Available Equity Weighted" rule set.

The selection of a secondary/backup allocation rule set and the default allocation rule set can be accomplished at many different levels. For example, a user may select the same backup and default allocation rule sets for all the account groups handled by the user. Alternatively, backup and default allocation rule sets may be selected for each individual account. Still further, backup and default allocation rule sets may be selected for a single transaction (or type of transaction). In yet another example, a user may select particular backup and default allocation rule sets to be associated with a particular primary rule set. As evident from these illustrative examples, many different options exist for selecting secondary/backup and default allocation rule sets.

The system may also set a minimum allocation size. This minimum allocation size may be user settable or preset and may vary depending upon the type of financial instrument in the order. For example, 100 may be a minimum allocation size for stocks and 1 may be a minimum allocation size for futures. If used, the system allocates the order to the sub-accounts based upon a multiple of the minimum allocation size. The actual allocated size may be either rounded up or rounded down from the calculated allocation size. If, for example, the user intended to ensure that the smallest sub-accounts receive a distribution, the user may select that the actual allocated size be rounded down from the calculated allocation size. Any remaining portion of the order after the initial allocation to all the sub-accounts may be allocated in any manner. For example, the allocation of the remaining order may begin with the largest accounts while rounding up.

The system may also periodically analyze the orders after being made but prior to execution of the order to determine if the order is still viable. For example, after a particular order (Order A) has been made but is still pending, prior pending orders have executed which have changed the capability of sub-accounts in the account group to handle Order A. In this situation, the system may prompt the user with the same options discussed above. Also, with instances where multiple pending orders cannot be executed, the system may selectively chose the last orders placed for modification/cancellation prior to handling earlier-placed orders.

As shown in step 40, an order may not be executed all at one time. For example, an order to purchase 100,000 shares of a particular stock may be broken up into several partial orders. The system is not limited in the manner in which a partial order is allocated upon execution. For example, partially executed orders may be buffered in the master account until the order is ready for complete allocation. An issue arising from this methodology is that conflicts may occur if there are multiple open orders existing with different account groups in the master account. In such a situation, the financial capability of the individual account groups may not be calculated properly, which could lead to credit risk errors.

In a current aspect of the system in step 50, each partially executed order is allocated in real-time to the sub-accounts using, for example, the selected allocation rule set. The system may also allow partial positions (i.e., fractions of a position), such as 0.27 futures, to be allocated to a sub-account. By allocating a partially executed order to the sub-accounts, a subsequent analysis of the financial capability of each sub-account or account group will better reflect the true financial capability of each account. An alternative to allocating partially executed orders in real-time is to select a time or value after which has been reached, partially executed orders are allocated. For example, a partially executed order may be buffered until 120 seconds after a prior allocation or after the buffered amounts exceeds $5,000.

After an order has been finalized (i.e., considered "not live") in step 60, such as when the complete order has been filled or for other reasons (e.g., the order has been cancelled or the end of the trading day has been reached), the distribution of the order to the sub-accounts may be rebalanced if, during partial execution of the order, the order was partially distributed to the sub-accounts. An order that spans multiple days may be treated as separate orders for allocation purposes. A rebalancing of the order may be desirable, since the final distribution of the order, after partial distributions of the order to the sub-accounts, may introduce inequities in the distribution, which may not comport to a distribution of the order if the allocation rule set was applied to just a single distribution of the order. The system is not limited as to the time in which the order is redistributed. For example, the order may be redistributed at the close of trading. However, in a current aspect, the order is redistributed as soon as the order has been finalized.

The system is also not limited as to the manner in which the finalized order is redistributed. For example, in one aspect, all trades (including commissions/fees) associated with the order are reversed out of the sub-accounts and credited to the user master account. At this time, commissions/fees associated with the order can be assessed at the master account level, which adjusts the price of the order. By charging commissions/fees to the order at the master account level, issues involving minimum commissions at the sub-account level can be avoided. Once an adjusted price of the order has been established, the order is allocated back to the sub-accounts based upon the selected allocation rule set. In this manner, each sub-account receives the same price.

The statement for each of the sub-accounts may include entries for each of these transactions (i.e., the partial allocations, followed by the reversing of the allocation, and then the reallocation). However, in a current aspect of the system, the statement only includes a single execution and a single commission per order per date.

The present invention may be practiced by employing conventional methodology and equipment. Accordingly, the details of such equipment and methodology are not set forth herein in detail. In the previous descriptions, numerous specific details are set forth, such as specific instructions, rules, processes, etc., in order to provide a thorough understanding of the present invention. However, it should be recognized that the present invention may be practiced without resorting to the details specifically set forth. In other instances, well known structures for performing server and client terminal functions have not been described in detail, in order not to unnecessarily obscure the present invention.

Only an exemplary aspect of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A system for trading financial instruments from a master account having a plurality of sub-accounts, comprising:
 a computer server connectable to a client terminal, the computer server being configured to:
  define an account group, the account group including a plurality of the sub-accounts,
  select a primary allocation model for the account group from a plurality of allocation models,
  select at least one secondary allocation model for the account group from the plurality of allocation models,
  prior to executing an order, evaluate the financial capability of the account group to execute the order,
  when the evaluation shows that the primary allocation model may be used, execute the order of financial instruments for the account group, and allocate the order to the sub-accounts using the primary allocation model after the order has been executed,
  when the evaluation shows that the primary allocation model may not be used, but the secondary allocation model may be used, execute the order of financial instruments for the account group, and allocate the order to the sub-accounts using the secondary allocation model after the order has been executed, and
  when the evaluation shows the first and secondary allocation models may not be used, execute the order of financial instruments for the account group, and allocate the order to the sub-accounts in accordance with the user's instruction after the order has been executed,
 wherein the allocation model defines an amount of the order to be allocated to each sub-account.

2. The system for trading financial instruments according to claim 1, wherein the individual financial capability of each sub-account in the account group is evaluated using the selected allocation model.

3. The system for trading financial instruments according to claim 1, wherein the financial capability of the account group is evaluated in real-time.

4. The system for trading financial instruments according to claim 1, wherein a partially executed order is allocated to the sub-accounts in real-time.

5. The system for trading financial instruments according to claim 4, wherein upon the execution of the order being completed, the order is reallocated to the sub-accounts using the selected allocation model.

6. The system for trading financial instruments according to claim 1, wherein the first and second allocation models are selected from the group consisting of: equal quantity weighted, net liquidation weighted, available equity weighted, percentage of order, ratio of order, and percentage of existing position.

7. The system for trading financial instruments according to claim 1, wherein the computer server is further configured to permit the user to modify the order if the order cannot be allocated using the primary or secondary allocation model.

8. A machine-readable medium having stored thereon instructions that, when executed by a computer at a computer server connectable to a client terminal, control the computer server to perform a method comprising the steps of:
  defining an account group, the account group including a plurality of sub-accounts,
  selecting a primary allocation model for the account group from a plurality of allocation models,
  selecting at least one secondary allocation model for the account group from the plurality of allocation models,
  prior to executing an order, evaluating the financial capability of the account group to execute the order,
  when the evaluation shows that the primary allocation model may be used, executing the order of financial instruments for the account group, and allocating the order to the sub-accounts using the primary allocation model after the order has been executed,
  when the evaluation shows that the primary allocation model may not be used, but the secondary allocation model may be used, executing the order of financial instruments for the account group, and allocating the order to the sub-accounts using the secondary allocation model after the order has been executed, and
  when the evaluation shows the first and secondary allocation models may not be used, executing the order of financial instruments for the account group, and allocating the order to the sub-accounts in accordance with the user's instruction after the order has been executed,
  wherein the allocation model defines an amount of the order to be allocated to each sub-account.

9. The machine-readable medium according to claim 8, wherein the individual financial capability of each sub-account in the account group is evaluated using the selected allocation model.

10. The system machine-readable medium according to claim 8, wherein the financial capability of the account group is evaluated in real-time.

11. The system machine-readable medium according to claim 8, wherein a partially executed order is allocated to the sub-accounts in real-time.

12. The machine-readable medium according to claim 11, wherein upon the execution of the order being completed, the order is reallocated to the sub-accounts using the selected allocation model.

13. The machine-readable medium according to claim 8, wherein the first and second allocation models are selected from the group consisting of: equal quantity weighted, net liquidation weighted, available equity weighted, percentage of order, ratio of order, and percentage of existing position.

14. The machine-readable medium according to claim 8, wherein the computer server is further configured to permit the user to modify the order if the order cannot be allocated using the primary or secondary allocation model.

15. A computer-implemented method for trading financial instruments from a master account having a plurality of sub-accounts, comprising the steps of:
  defining an account group, the account group including the plurality of sub-accounts,
  selecting a primary allocation model for the account group from a plurality of allocation models,
  selecting at least one secondary allocation model for the account group from the plurality of allocation models,
  prior to executing an order, evaluating, by a computer server, the financial capability of the account group to execute the order,
  when the evaluation shows that the primary allocation model may be used, executing by the computer server the order of financial instruments for the account group, and allocate the order to the sub-accounts using the primary allocation model after the order has been executed,
  when the evaluation shows that the primary allocation model may not be used, but the secondary allocation model may be used, executing by the computer server the order of financial instruments for the account group, and allocate the order to the sub-accounts using the secondary allocation model after the order has been executed, and
  when the evaluation shows the first and secondary allocation models may not be used, executing by the computer server the order of financial instruments for the account group, and allocate the order to the sub-accounts in accordance with the user's instruction after the order has been executed,
  wherein the allocation model defines an amount of the order to be allocated to each sub-account.

16. The computer-implemented method according to claim 15, wherein the individual financial capability of each sub-account in the account group is evaluated using the selected allocation model.

17. The computer-implemented method according to claim 15, wherein the financial capability of the account group is evaluated in real-time.

18. The computer-implemented method according to claim 15, wherein a partially executed order is allocated to the sub-accounts in real-time.

19. The computer-implemented method according to claim 18, wherein upon the execution of the order being completed, the order is reallocated to the sub-accounts using the selected allocation model.

20. The computer-implemented method according to claim 15, wherein the first and second allocation models are selected from the group consisting of: equal quantity weighted, net liquidation weighted, available equity weighted, percentage of order, ratio of order, and percentage of existing position.

21. The machine-readable medium according to claim 15, wherein the computer server is further configured to permit the user to modify the order if the order cannot be allocated using the primary or secondary allocation model.

* * * * *